United States Patent
Schiefer et al.

(10) Patent No.: US 12,442,887 B2
(45) Date of Patent: Oct. 14, 2025

(54) METHOD AND SYSTEM FOR RADIO TRANSMISSION OF DATA RELATED TO A PRODUCTION INSTALLATION

(71) Applicant: Siemens AG Österreich, Vienna (AT)

(72) Inventors: Martin Schiefer, St. Pölten (AT); Janos Gila, Mödling (AT)

(73) Assignee: SIEMENS AKTIENGESELLSCHAFT, Munich (DE)

(*) Notice: Subject to any disclaimer, the term of this patent is extended or adjusted under 35 U.S.C. 154(b) by 285 days.

(21) Appl. No.: 18/036,307

(22) PCT Filed: Nov. 8, 2021

(86) PCT No.: PCT/EP2021/080934
§ 371 (c)(1),
(2) Date: May 10, 2023

(87) PCT Pub. No.: WO2022/101135
PCT Pub. Date: May 19, 2022

(65) Prior Publication Data
US 2024/0012091 A1    Jan. 11, 2024

(30) Foreign Application Priority Data
Nov. 12, 2020  (EP) .................................. 20207112

(51) Int. Cl.
*G01S 5/02*    (2010.01)
*H01Q 15/14*   (2006.01)
(Continued)

(52) U.S. Cl.
CPC ........ *G01S 5/0284* (2013.01); *H04B 7/04013* (2023.05); *H04B 17/3913* (2015.01)

(58) Field of Classification Search
None
See application file for complete search history.

(56) References Cited

U.S. PATENT DOCUMENTS 8,498,639 B2 * 7/2013 Chen ..................... H04L 1/0027
455/574
8,593,998 B2 * 11/2013 Phan Huy ......... H04L 25/03114
370/280

(Continued)

OTHER PUBLICATIONS

Kisseleff, Steven et al. "Reconfigurable Intelligent Surfaces in Challenging Environments", arxiv.org, Cornell University Library, 201 Olin Library Cornell University Ithaca; NY 14853; Nov. 10, 2020.

(Continued)

*Primary Examiner* — Tuan A Tran
(74) *Attorney, Agent, or Firm* — Cozen O'Connor

(57) ABSTRACT

A computer-implemented method for radio transmission of data related to a production installation from a transmitter to a receiver via a controllable reflector, wherein at least one radio channel model is produced and trained by a processor with a memory for the production installation between the transmitter and the receiver based on machine learning, where a radio channel model is determined for each configuration installations of the production installation, a current configuration of installations of the production installation is determined, the reflector is controlled for the current configuration with the aid of the determined radio channel model, and where the data are transmitted from the transmitter to the receiver via the reflector.

13 Claims, 3 Drawing Sheets

(51) Int. Cl.
  *H04B 7/04*      (2017.01)
  *H04B 7/0456*    (2017.01)
  *H04B 7/06*      (2006.01)
  *H04B 17/391*    (2015.01)

(56) References Cited

U.S. PATENT DOCUMENTS

| | | | |
|---|---|---|---|
| 9,137,878 B2* | 9/2015 | Thompson | H05B 47/196 |
| 10,419,948 B1* | 9/2019 | Labadie | H01Q 3/005 |
| 10,433,184 B2* | 10/2019 | Lee | H04W 64/003 |
| 10,869,364 B2* | 12/2020 | Logothetis | H04B 1/0003 |
| 11,503,668 B2* | 11/2022 | Logothetis | G06N 3/006 |
| 11,664,881 B2* | 5/2023 | Shahvirdi Dizaj Yekan | H04B 7/082 375/262 |
| 11,917,427 B2* | 2/2024 | Wu | H01Q 1/246 |
| 2011/0244786 A1* | 10/2011 | Fujii | H01Q 19/104 455/7 |
| 2016/0007214 A1 | 1/2016 | Ekiz et al. | |
| 2019/0044246 A1* | 2/2019 | Pitsillides | H01Q 15/0086 |
| 2019/0181920 A1* | 6/2019 | Rofougaran | H04B 7/022 |
| 2020/0128359 A1* | 4/2020 | Patil | H04W 24/02 |
| 2020/0259545 A1* | 8/2020 | Bai | H04W 72/046 |
| 2021/0013619 A1* | 1/2021 | Alkhateeb | H04B 7/04013 |
| 2021/0058137 A1* | 2/2021 | Shahvirdi Dizaj Yekan | H01Q 3/16 |
| 2022/0014935 A1* | 1/2022 | Haija | H04L 5/0048 |
| 2022/0052764 A1* | 2/2022 | Medra | H04B 10/614 |

OTHER PUBLICATIONS

PCT International Search Report dated Feb. 24, 2022 based on PCT/EP2021/080934 filed Nov. 8, 2021.

Kisseleff, Steven et al. "Reconfigurable Intelligent Surfaces in Challenging Environments: Underwater, Underground, Industrial and Disaster", reconfigurable intelligent surfaces in challenging environments, pp. 1-12, Nov. 10, 2020.

* cited by examiner

METHOD AND SYSTEM FOR RADIO TRANSMISSION OF DATA RELATED TO A PRODUCTION INSTALLATION

CROSS-REFERENCE TO RELATED APPLICATIONS

This is a U.S. national stage of application No. PCT/EP2021/080934 filed 8 Nov. 2021. Priority is claimed on European Application No. 20207112.2 filed 12 Nov. 2020, the content of which is incorporated herein by reference in its entirety.

BACKGROUND OF THE INVENTION

1. Field of the Invention

The invention relates to a system, computer program, electronically readable data carrier, data carrier signal and computer-implemented method for radio transmission of data related to a production installation from a transmitter to a receiver via a controllable reflector.

2. Description of the Related Art

In modern factories, production machines are taking on an increasing number of working steps that were previously performed by humans. In this connection, the automatic production and the networking of all working devices and working steps are playing an increasingly important role. The machines are generally controlled by industrial control installations, such as SIMATIC. These control installations are nowadays usually connected to one another via electrical lines. In the future, it will however be necessary to coordinate, optimize and therefore reconfigure the machines and the production steps better, which may require adapting the working steps or a spatial position of the machines.

Special electrical lines in the form of flexible and expensive cables are usually used in the connection between production machines and the control unit.

As an alternative, radio systems are also available, but these, in an industrial environment, such as in a hall containing a large number of machines, usually form a large number of points for reflections and shading of radio waves. There is also not always direct visual contact between a transmission unit and a reception unit. These influences may have the effect that radio transmission is negatively influenced, in particular at higher frequencies, which usually permit a large bandwidth, low latency, small installation size, low complexity and low costs for the radio system, and the availability of the production system is thereby insufficient.

In order to improve the availability of the production system when using a radio system, the number of radio modules may be increased, but this may lead to high infrastructure costs.

As an alternative, what is known as an intelligent reflector may be placed between the transmitter and receiver, from which the radio waves are reflected in a targeted manner and as a result of which an improved radio connection between transmitter and receiver is created. In this case, however, there is generally the problem that the radio channel has unknown radio channel parameters that have to be acquired in an expensive and time-consuming manner. Furthermore, radio channel parameters determined in this way are valid only for one installation configuration in a hall and have to be redetermined for a changed configuration.

Such configuration changes may require fast adaptation of the radio system, which undesirably increases system complexity in the prior art and entails cost disadvantages. The foregoing disadvantages greatly restrict the mobility of installation parts, in particular in an industrial hall.

SUMMARY OF THE INVENTION

In view of the foregoing, it is an object of the present invention to provide a system and method that overcome the stated disadvantages and that allows improved mobility of an installation configuration when using radio communication.

These and other objects and advantages are achieved in accordance with the invention achieved by a system and method, where at least one radio channel model is generated and trained based on machine learning for the production installation between the transmitter and the receiver by a processor with a memory, where a respective radio channel model is ascertained for a configuration of installations of the production installation, a current configuration of installations of the production installation is ascertained, the reflector is actuated with the aid of the ascertained radio channel model for the current configuration, and the data are transmitted from the transmitter to the receiver via the reflector.

The invention achieves an improved radio connection when the production system containing machines is reconfigured. If a machine is rearranged, then machine learning may be used to ascertain an expedient position of the reflector, via which optimal radio transmission between the transmitter and receiver via the reflector is achieved.

The controllable reflector may be formed, for example, by an electrically actuatable, physical one-part or multipart reflector surface on metal or can be formed by one or more electronically controllable antenna elements, which may also have reflector elements and director elements.

Depending on the desired frequency range of the reflector, various embodiments may be expedient for a reflector, for example, in the high-frequency gigahertz range as an variably actuatable antenna array that has a controllable complex resistance in the antenna base.

The controllable reflector in this connection is understood to mean a device that receives electromagnetic waves, for example, from one direction, and reflects them all or only in part in another direction in a targeted manner, and/or vice versa.

A reflector surface of a controllable reflector is thus understood to mean, for example, not only a geometrical surface, but rather also the aperture or the direction characteristic of the controllable reflector.

Electronic actuation of one or more reflector elements makes it possible to achieve a variably definable reflection characteristic or pattern for the controllable reflector, for example, with the aid of phase-shifting elements or components in the actuation of the controllable reflector.

The current configuration of the reflector or of the reflector surface may be transmitted with the aid of a wireless or wired communication channel to actuate the controllable reflector in the current configuration with the aid of appropriate controllers.

In one embodiment of the invention, between a previous, known configuration of installations of the production installation and the current configuration, a motion trajectory of the configuration changes is ascertained and a respective configuration of installations and building information in relation to the production installation along the motion trajectory are ascertained at selected discrete points, for which the reflector is actuated with the aid of the corresponding radio channel model.

This achieves a situation whereby, during the entire production process, i.e., across multiple manufacturing steps, it is possible to ensure a sufficiently good or optimal quality of data transmission between the transmitter and the receiver despite a configuration change of the installations.

A radio system may furthermore be configured in a very simple and optimum manner, which simplifies the system, is inexpensive and allows robust data transmission during operation that is able to respond highly dynamically to a change in the configuration of the machine locations or of the interior. In some cases, system redundancy may even be dispensed with.

In one embodiment of the invention, the current configuration additionally comprises information about the building and/or the interior and/or the machine geometry of the production installation. This achieves a situation whereby, during a configuration change of the installations, the surroundings of the respective installation is also taken into consideration when determining the radio channel model.

In another embodiment of the invention, the radio channel model for a respective production step is determined by the processor and the reflector is actuated with the aid of the corresponding radio channel model for the respective production step. It is thereby possible to ensure the quality of the data transmission between the transmitter and the receiver even during a process chain for manufacturing a complex product, since the processor is aware of the resources required for a respective process step, that is to say for example the installations of the production installation that are used and their respective current arrangement within the production installation, and these resources are accordingly able to be taken into consideration in the radio channel model.

Furthermore, using a known new configuration, the redetermination of the subsequent radio channel model may be ascertained particularly easily using artificial intelligence, which is advantageous in particular along trajectories.

Trajectories may be easily determined, for example, for mobile machines with a predetermined motion path.

In a further embodiment of the invention, when determining the radio channel model, processor takes into consideration a ray tracing method. The number of radio channel models to be determined may thereby be reduced and the efficiency of the computation may be increased.

In other words, unrealistic, improbable or theoretically impossible scenarios in terms of radio wave propagation may be omitted, both in the training phase and in the application phase of the radio channel model.

In another embodiment of the invention, the respective position is ascertained at least partially for the installations of the production installation and is taken into consideration when determining the radio channel model.

It is also possible to for the current position of the adjustable reflector to be taken into consideration when determining the radio channel model, for example, in the context of a starting position based on which a new position is ascertained, which may simplify updating of the radio channel model.

Additionally, it is possible for the current quality of the radio communication between the transmitter and the receiver to be taken into consideration when determining the radio channel model, for example in order to perform validation with an existing radio channel model. This makes it possible to reduce the complexity of certain radio channel models and the computation thereof.

In yet another embodiment of the invention, the radio channel model is ascertained in the cloud in a manner controlled by the processor.

The local system may thereby be configured in an optimized manner, and computationally intensive processes may be performed by an efficient cloud system.

The objects and advantages in accordance with the invention are also achieved by a computer program comprising commands which, when they are executed by a computer, prompt the computer to implement the method in accordance with disclosed embodiments of the invention.

The objects and advantages in accordance with the invention are also achieved by an electronically readable data carrier containing readable control information stored thereon, which control information comprises the computer program in accordance with the invention and is configured such that, when the data carrier is used in a computing apparatus, it performs a method according to the invention.

The objects and advantages in accordance with the invention are also achieved by a data carrier signal that transmits the computer program in accordance with the invention.

The objects and advantages in accordance with the invention are also achieved by a system for radio transmission of data related to a production installation from a transmitter to a receiver via at least one controllable reflector, where the system has a processor with a memory, which processor is configured to generate and train at least one radio channel model for the production installation between the transmitter and the receiver, where a radio channel model for a configuration of installations and building information related to the production installation are each present, and the processor is furthermore configured to implement the method in accordance with disclosed embodiments of the invention.

In another embodiment of the invention, the transmitter and the reflector are arranged spatially at the same positions in respectively different configurations of installations and building information.

In an embodiment of the invention, the transmitter and the reflector are connected to the system by a wired data transmission system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below with reference to an exemplary embodiment that is illustrated in the appended drawings, in which.

DETAILED DESCRIPTION OF THE EXEMPLARY EMBODIMENTS

It is clear that other parts that are not shown are required for the operation of a production installation, such as workpieces, resources or electronic controllers. These parts are not illustrated and described in order to improve understanding.

Figure 1:
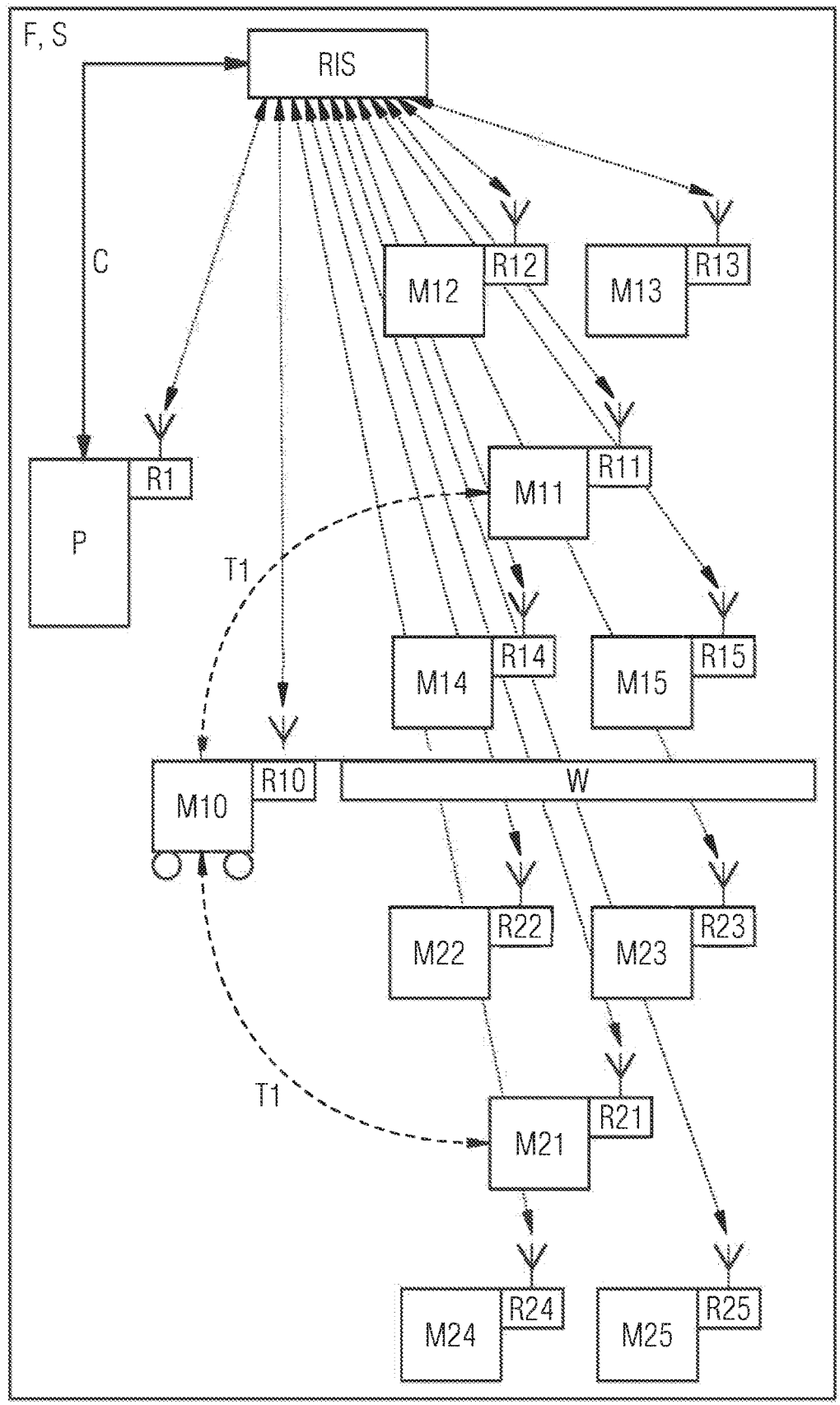
FIG. 1 shows a first exemplary configuration of installations of a production system in accordance with the invention.

FIG. 1 shows a first exemplary configuration of installations in the form of machines M10-M15, M21-M25 of a production system S that is arranged within a production installation F, such as an industrial hall.

FIG. 1 shows a schematic plan view, and it should be noted that the transmitter and/or the controllable reflector RIS should advantageously be attached high above the ground in order, where possible, to enable a direct visual connection to the machines M10-M15, M21-M25.

However, this is not always possible, for example, when a machine has a very large structural form or machine geometry, such as a CNC milling machine in a safety cage, or an interior, such as a safety wall W.

A current configuration may therefore comprise information about the building containing the production installation F and/or the interior and/or the machine geometry of the production installation F.

A robot arm M11 calls on the machines M12 to M15 to machine a workpiece. By way of example, the machine M12 may perform drilling, the machine M13 may perform milling, the machine M14 may perform polishing and the machine M15 may insert screws.

A mobile transport machine M10 transports the machined workpiece to a following manufacturing step.

FIG. 1 shows a motion trajectory T1, along which the transport machine M10 moves from one manufacturing step to a following manufacturing step. Here, a robot arm M21 again calls on the machines M22 to M25 to machine the workpiece.

By way of example, the machine M22 may perform adhesive bonding, the machine M13 may perform riveting, the machine M14 may pretreat surfaces with chemicals and the machine M15 may perform screwing.

A processor P with a memory is connected to a transmitter R1, such as a WLAN base station, in a wired manner, where provision may also be made for a distance between the processor P and the transmitter R1 due to corresponding assembly requirements.

Each machine is equipped in this example with its own radio module R10-R15 or R21-R25, via which the respective installation can communicate with a central control unit.

It is clear that there may also be a direct visual radio connection between the transmitter R1 and one or more receivers R10-R15, R21-R25.

In the computer-implemented method for the radio transmission of data in relation to the production installation F between the transmitter R1, the reflector RIS with a controllable reflector and the receiver R10-R15 or R21-R25, the transmitter R1 emits a transmission signal containing the data in relation to the production installation F, where the signal is reflected by the reflector RIS and is received by the corresponding receiver R10-R15 or R21-R25.

In this case, at least one radio channel model is generated and trained based on machine learning for the production installation F between the transmitter R1 and the receiver R10-R15, R21-R25 by the processor P with the memory.

A respective radio channel model is ascertained for a configuration of installation parts M10-M15, M21-M25 of the production installation F.

Furthermore, a current configuration of the installation parts M10-M15, M21-M25 of the production installation F is ascertained.

The reflector RIS is actuated with the aid of the ascertained radio channel model for the current configuration.

In order to ensure a radio connection between the central control unit, which contains the processor P with the memory, provision is made for the controllable reflector RIS, which may influence the radio channels.

The processor P may be connected to a cloud in order, for example, to perform complex computations such as ascertaining a radio channel model in the cloud, where these computations are controlled by the processor P.

The determination of a radio channel model for a respective production step within a manufacturing process for a workpiece or a product may be performed by the processor (P).

The reflector RIS is actuated with the aid of the corresponding radio channel model for the respective production step.

When determining the radio channel model, a ray tracing method may be taken into consideration by the processor P.

The respectively current position for the installation parts M10-M15, M21-M25 of the production installation F may be ascertained and taken into consideration when determining the radio channel model.

The controllable reflector RIS may, for example, be an electromagnetic mirror that may be rotated horizontally and/or tilted vertically by way of servo motors.

In a further exemplary embodiment of the invention, the antenna characteristic of the reflector RIS may be changed electronically; the mechanical position may in the process remain unchanged.

The device for controlling an antenna characteristic may be, for example, PIN or varactor diodes, and semiconductor or MEMS components.

It may be the case that machines M10-M15, M21-M25, in a given position within the production installation F, have a good or optimal radio connection to the central control apparatus. For these cases, it is not absolutely necessary to improve the radio connection using the controllable reflector RIS.

For cases in which, for example, there is shading caused by large installation parts or with regard to the building, the interior, such as the safety wall W or the machine geometry of installation parts of the production installation F, appropriately adjusting the controllable reflector RIS, makes it possible to improve the properties of the radio channel.

The reflector RIS is controlled in terms of rotation and pivoting by the processor P, with a wired communication channel C being available for this purpose, because provision is made in this example for the processor P and the reflector RIS to be mounted at a fixed location, while the installation parts M10-M15, M21-M25 are configurable, i.e., mobile.

The communication channel C may also serve to transmit control information for actuating the antenna characteristic using electronic devices of the reflector RIS.

The communication channel may also be established by wireless radio transmission instead of wired transmission, for example, via Bluetooth, Zigbee, Wireless HART or the like.

The machines M10-M15, M21-M25, the processor P and the respective radio modules R1, R10-R15, R21-R25 form a system S with a first configuration that comprises the current location or the current position of the machines.

It is possible, between a previous, known configuration of the installation parts M10-M15, M21-M25 of the production installation F and the current configuration, to ascertain a motion trajectory T1 of the configuration changes.

A respective configuration of the installation parts M10-M15, M21-M25 and building information in relation to the production installation F are ascertained along the motion trajectory T1 at selected discrete points, for which the reflector RIS is actuated with the aid of the corresponding radio channel model.

FIG. 1 does not illustrate control devices for controlling the machines or other installations that are needed to manufacture a workpiece using the production installation F, in order to improve understanding of the invention.

It is clear that, instead of a single controllable reflector RIS, multiple controllable reflectors may also be used in a system according to the invention.

In FIG. 1, the radio connections are indicated symbolically in dashed lines, where it is clear that multipath propagation across multiple reflection points in a real radio environment is included.

The function of a transmitter or receiver is a current function of the respective radio module at a specific time, which may naturally also communicate in the opposite direction.

In other words, a radio module R10-R15, R21-R25 of an associated machine M10-M15, M21-M25 at one time may also be in the function of a transmitter, and the radio module R1 of the associated processor P may accordingly be in the function of a receiver.

Figure 2:
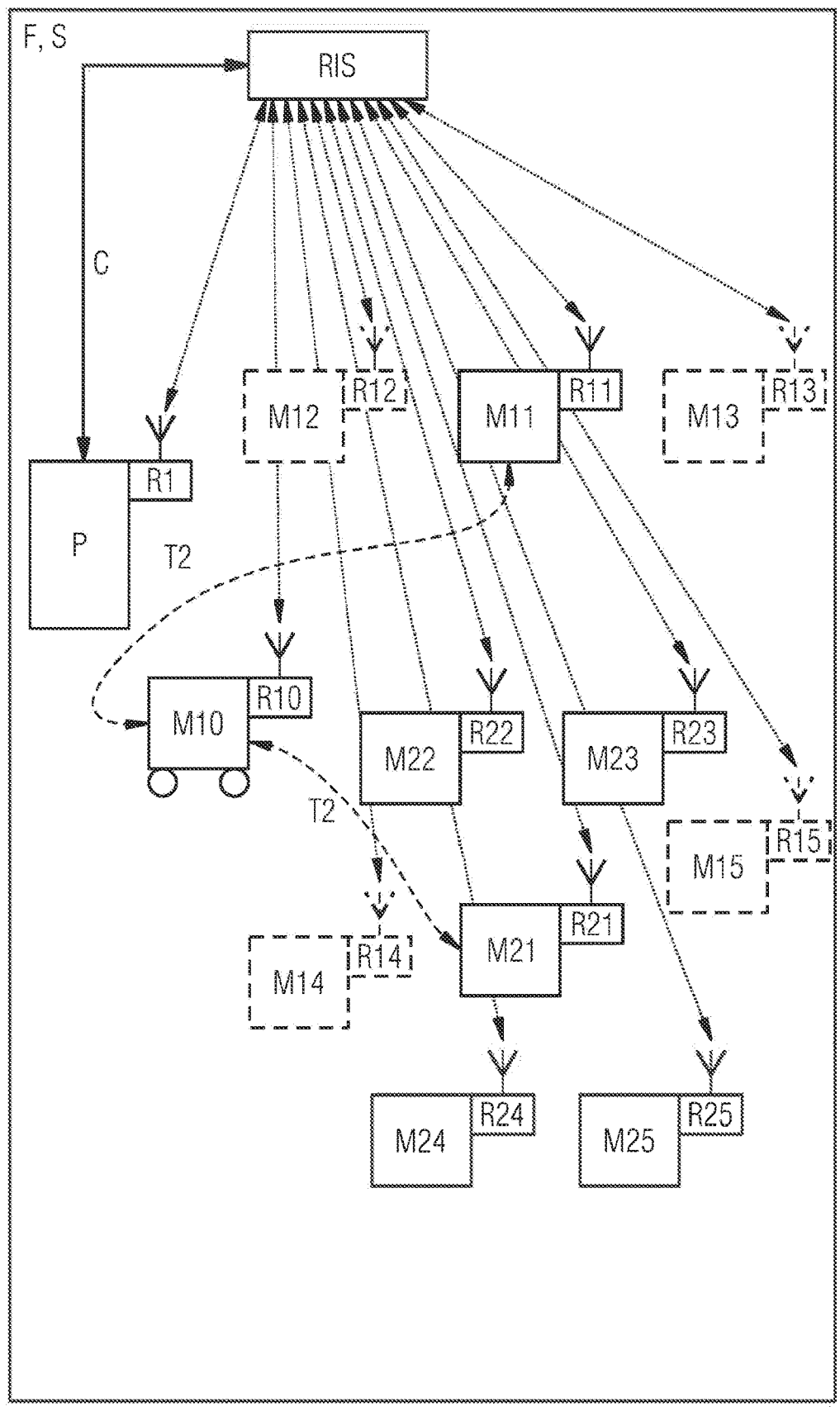
FIG. 2 shows a second exemplary configuration of installations of a production systems in accordance with the invention.

FIG. 2 shows a second exemplary further configuration of the installations of the production installation F, wherein the current location or the current position of the machines R10-R15, R21-R25 is changed.

A trajectory T2 of the mobile transport machine M10 also has a changed profile.

The changed positions may lead to the radio channels having different profiles or, for example, being disrupted in an undesirable manner by shading or reflections from other machines or building parts.

The further statements from the previous figure apply analogously.

Figure 3:
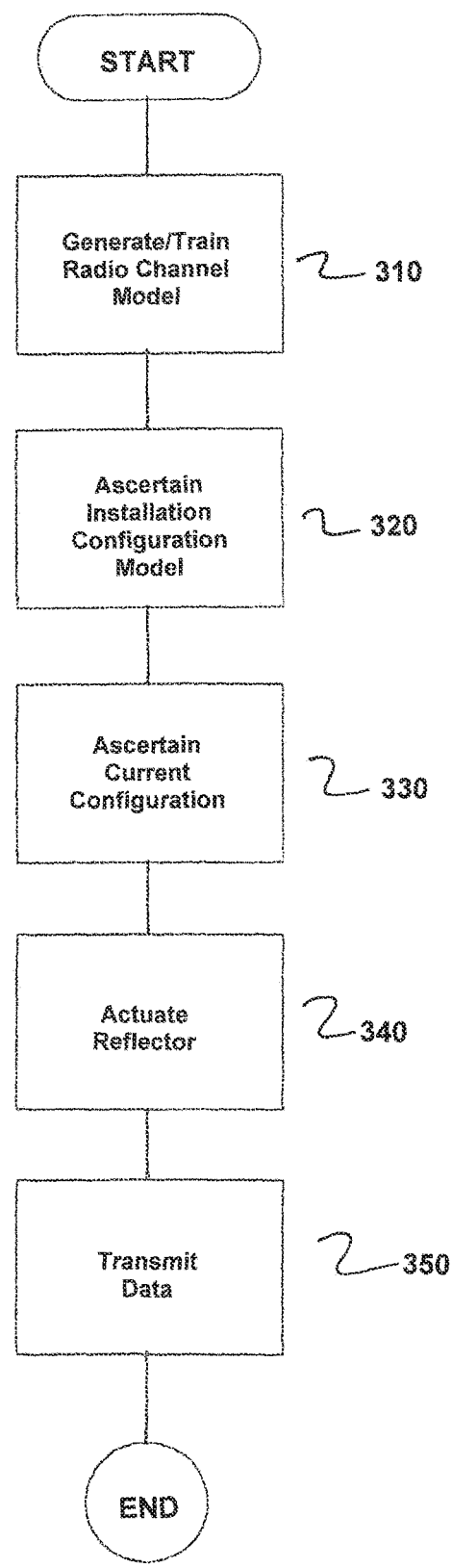
FIG. 3 is a flowchart of the method in accordance with the invention.

FIG. 3 is a flowchart of the computer-implemented method for radio transmission of data related to a production installation F from a transmitter R1 to a receiver R10-R15, R21-R25 via a controllable reflector RIS.

The method comprises generating at least one radio channel model and training the generated at least one radio channel model based on machine learning for the production installation F between the transmitter R1 and the receiver R10-R15, R21-R25 by a processor P with a memory, as indicated in step 310.

Next, ascertaining a respective radio channel model for a configuration of installations M10-M15, M21-M25 of the production installation F is ascertained, as indicated in step 320.

Next, ascertaining a current configuration of installations M10-M15, M21-M25 of the production installation F is ascertained, as indicated in step 330.

Next, the controllable reflector RIS is actuated with the aid of the ascertained radio channel model for the current configuration, as indicated in step 340.

Next, the data is transmitted from the transmitter R1 to the receiver R10-R15, R21-R25 via the reflector RIS, as indicated in step 350.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A computer-implemented method for radio transmission of data related to a production installation from a transmitter to a receiver via a controllable reflector, the method comprising:
   generating at least one radio channel model and training the generated at least one radio channel model based on machine learning for the production installation between the transmitter and the receiver by a processor with a memory;
   ascertaining a respective radio channel model for a configuration of installations of the production installation;
   ascertaining a current configuration of installations of the production installation;
   actuating the controllable reflector aided by the ascertained radio channel model for the current configuration; and
   transmitting the data from the transmitter to the receiver via the reflector.

2. The method as claimed in claim 1, wherein, between a previous, known configuration of installations of the production installation and the current configuration, a motion trajectory of the configuration changes is ascertained and a configuration of installations and building information in relation to the production installation are each ascertained along the motion trajectory at selected discrete points, for which the controllable reflector is actuated aided by the corresponding radio channel model.

3. The method as claimed in claim 2, wherein the current configuration additionally comprises information about at least one of (i) a building, (ii) an interior of the building and (iii) machine geometry of the production installation.

4. The method as claimed in claim 1, wherein the current configuration additionally comprises information about at least one of (i) a building, (ii) an interior (W) of the building and (iii) machine geometry of the production installation.

5. The method as claimed in claim 1, wherein the radio channel model for a respective production step is determined by the processor and the controllable reflector is actuated aided by a corresponding radio channel model for the respective production step.

6. The method as claimed in claim 1, wherein a ray tracing method is taken into consideration by the processor when determining the at least one radio channel model.

7. The method as claimed in claim 1, wherein a respective position is ascertained at least partially for the installations of the production installation and taken into consideration when determining the at least one radio channel model.

8. The method as claimed in claim 1, wherein the at least one radio channel model is ascertained in the cloud in a manner controlled by the processor.

9. A non-transitory electronically readable data carrier encoded with readable control information comprising at least one computer program which, when executed in a computing apparatus, causes radio transmission of data related to a production installation from a transmitter to a receiver via a controllable reflector, the computer program comprising:

program code for generating at least one radio channel model and training the generated at least one radio channel model based on machine learning for the production installation between the transmitter and the receiver by a processor with a memory;

program code for ascertaining a respective radio channel model for a configuration of installations of the production installation;

program code for ascertaining a current configuration of installations of the production installation;

program code for actuating the controllable reflector aided by the ascertained radio channel model for the current configuration; and program code for transmitting the data from the transmitter to the receiver via the reflector.

10. A system for the radio transmission of data in relation to a production installation from a transmitter to a receiver via a controllable reflector, the system comprising:

a processor including a memory;

wherein the processor is configured to:
    generate and train at least one radio channel model for the production installation between the transmitter and the receiver;

wherein a radio channel model for a configuration of installations and building information related to the production installation are each present; and wherein the processor is further configured to:
    ascertain a respective radio channel model for a configuration of installations of the production installation;
    ascertain a current configuration of installations of the production installation;
    actuate the controllable reflector aided by the ascertained radio channel model for the current configuration; and
    initiate transmittal of the data from the transmitter to the receiver via the controllable reflector.

11. The system as claimed in claim 10, wherein the transmitter and the controllable reflector are arranged spatially at the same positions in respectively different configurations of installations and building information.

12. The system as claimed in claim 10, wherein the transmitter and the controllable reflector are connected to the system by a wired data transmission system.

13. The system as claimed in claim 11, wherein the transmitter and the controllable reflector are connected to the system by a wired data transmission system.

* * * * *